Sept. 11, 1956  A. F. SMITH  2,762,769
PROCESS FOR CONTINUOUS PRODUCTION OF POLYVINYL CHLORIDE
Filed Jan. 26, 1951  3 Sheets-Sheet 2

INVENTOR,
Arthur F. Smith
BY Charles Shepard
Attorney

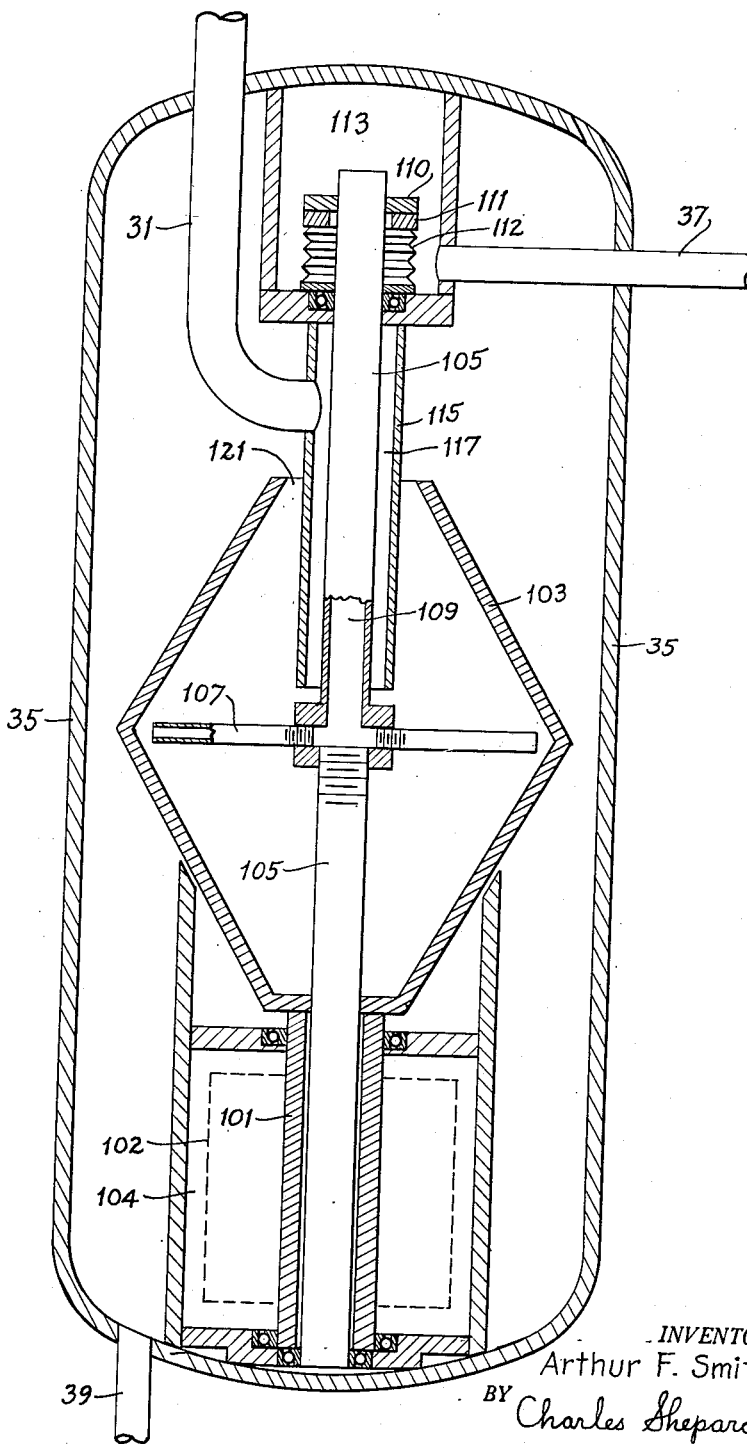

United States Patent Office 2,762,769
Patented Sept. 11, 1956

2,762,769

PROCESS FOR CONTINUOUS PRODUCTION OF POLYVINYL CHLORIDE

Arthur F. Smith, Webster, N. Y.

Application January 26, 1951, Serial No. 207,941

15 Claims. (Cl. 204—163)

The present invention relates to the production of polyvinyl chloride from the monomer thereof. An object of the invention is the provision of a generally improved and more satisfactory process for such production, and particularly a process which may be operated on a continuous flow basis as distinguished from a batch.

Another object of the invention is the provision of a process which is easier and safer to operate than prior processes for the production of polyvinyl chloride, especially in reducing the danger of explosion.

A further object is the provision of a process in which the quality and other characteristics of the product may be easily and accurately controlled.

A still further object is the provision of improved apparatus for carrying out the process, some features of which apparatus are useful also in other processes.

These and other desirable objects may be attained in the manner disclosed as an illustrative embodiment of the invention in the following description and in the accompanying drawings forming a part hereof, in which:

Fig. 3 is a diagrammatic vertical section taken centrally through a centrifuge forming part of the present apparatus.

The same reference numerals throughout the several views indicate the same parts.

Figure 1:
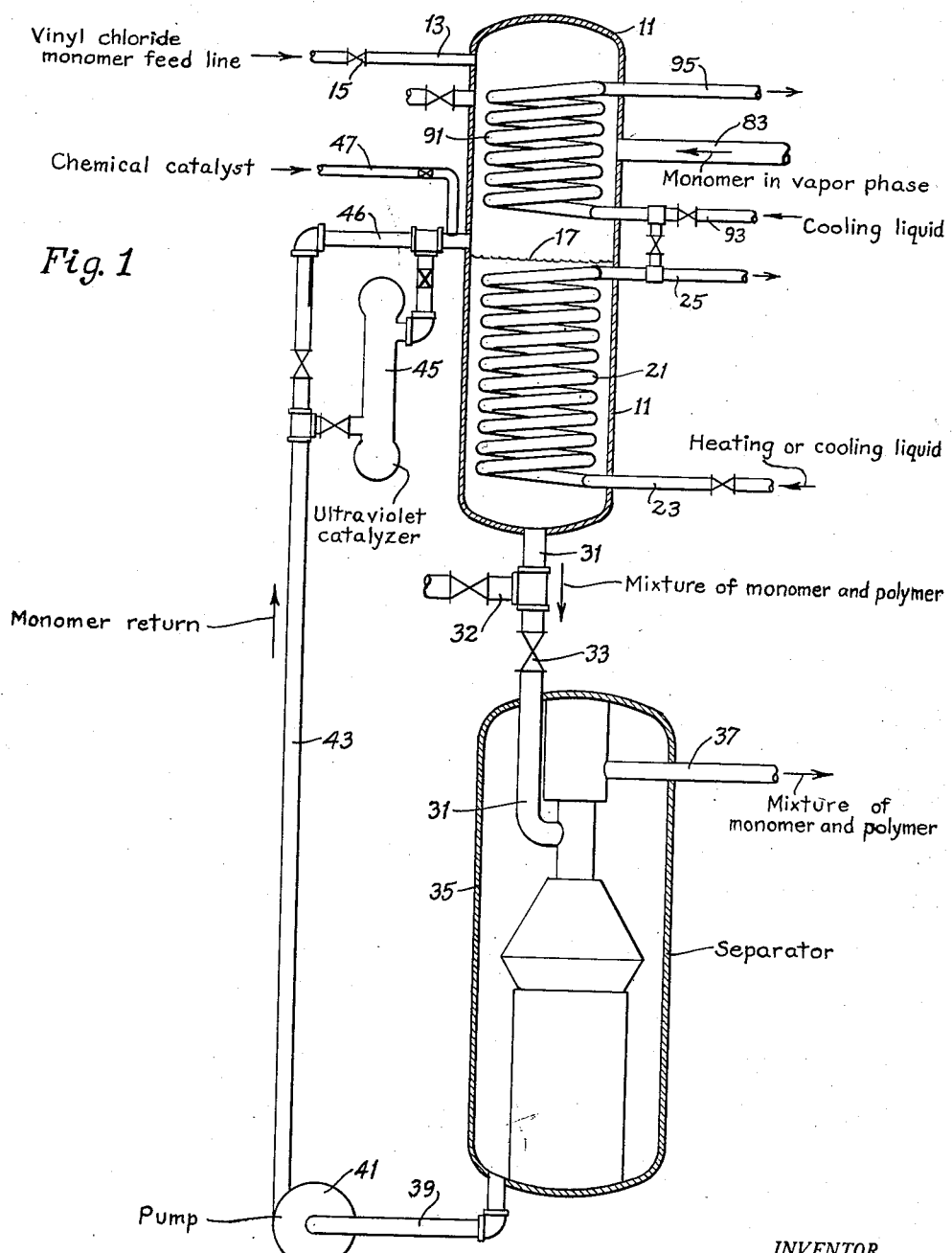
Fig. 1 is a somewhat schematic or diagrammatic view of the left hand part of apparatus for carrying out the present process.
Figure 2:
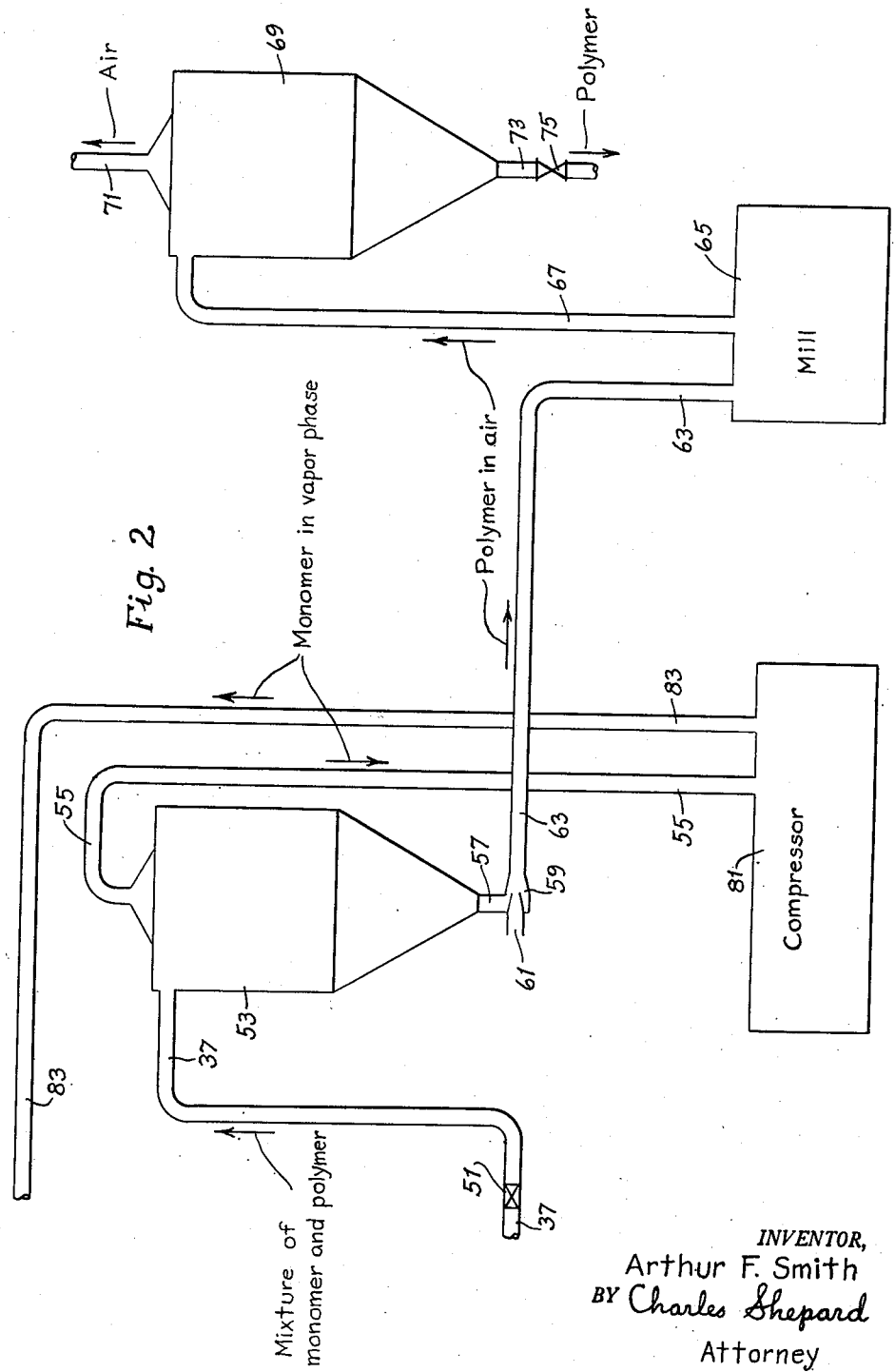
Fig. 2 is a view, likewise schematic, of the right hand portion of the apparatus, being in effect a rightward continuation of what is shown in Fig. 1.

It is well known that polyvinyl chloride can be produced from vinyl chloride monomer by heating the monomer in the presence of a catalyst, but the prior processes for accomplishing this polymerization, or at least those processes which have gone into practical commercial use, either have been processes utilizing the monomer in the state of a solution, suspension, or emulsion (all undesirable because of the great dilution of monomer) or, if utilizing plain undiluted monomer, have been batch or intermittent processes as distinguished from a true continuous process such as is provided by the present invention, wherein the monomer may be continuously added to the reacting vessel and the polymer may be continuously withdrawn from the apparatus. A process employing plain undiluted monomer may be called the "block" process, to distinguish it from the solution process, the suspension process, and the emulsion process. One of the reasons why only batch operations have been used in the past, in the block process, is probably the unstable character of the block process as previously carried out, and the danger of explosion of the contents of the polymerization vessel. Continuous polymerization has been successfully practiced in production of the polymer by the emulsion and suspension processes, but this entails the disadvantage of the presence of the emulsifier or the suspending diluent and is a relatively costly process. So far as now known, it has not heretofore been feasible or practical to produce the polymer from the monomer of vinyl chloride, by a continuous operation, when using a block process rather than an emulsion or suspension process. Such continuous production by a block process may be accomplished by the present invention entirely feasibly and practicably, in a manner which is relatively simple, safe, inexpensive, and easily controlled.

According to the present invention, a suitable reaction vessel or polymerization vessel is indicated diagrammatically at 11, and is completely closed or sealed, except for the various inlet and outlet pipes and except for any desired manhole which may be provided for access to the interior when required. The vinyl chloride monomer is added continuously near the top of the vessel through the inlet or feed conduit 13, at a rate dependent upon the control valve 15. The liquid level is maintained in the vessel 11 at approximately the line 17.

In the lower part of this vessel 11, below the liquid level 17, is the heat control means such as the coil 21 comprising any desired number of turns or convolutions, supplied with fluid through the inlet conduit 23 and the outlet conduit 25, controlled by valve 27. At the start of the process, hot water is introduced into this coil 21 to apply heat to the liquid monomer in the vessel 11, in order to start the polymerization reaction. But as soon as the reaction starts, the hot water is turned off and cold water is introduced, since the polymerization reaction is violently exothermic and it is necessary to withdraw heat from the reacting monomer, rather than add heat to it. The cold water is introduced into the coil at a high rate of flow to produce great turbulence in the water within the coil, to aid rapid heat transfer to the coil fluid from the vinyl chloride within the reaction vessel 11.

In the present process, the liquid within the vessel is boiled under reflux condutions, the vapor rising to the top of the vessel being condensed by the condensing or reflux coil 91 as described below. The pressure in the vessel 11, above the liquid level 17 therein, is normally maintained at approximately 80 to 150 lbs. per square inch, and the temperature of the liquid is maintained at approximately 40 to 70 degrees centigrade, or high enough to cause boiling of the fluid. Due to the turbulence and agitation produced by the boiling of the liquid, the heat is well spread throughout the liquid and no localized hot spots occur, so that the danger of explosion from excessive localized heating is not present.

Liquid is constantly drawn off from the bottom of the vessel 11 through the outlet conduit 31, controlled by valve 33, and is introduced into a suitable separator for separating the solid polymer from the liquid monomer, although it is not required that absolutely complete separation take place in the separator. Conveniently, the mixture is withdrawn from the vessel 11 at such rate, compared to the progress of the reaction in the vessel 11, that the withdrawn mixture contains preferably a minor amount of polymer and a major amount of monomer. The proportions of monomer and polymer may vary widely, depending upon the amount of separating capacity which is available and economically feasible, and upon other considerations. A proportion which gives good results is about 99½% monomer and about ½% polymer. A low concentration of polymer, somewhat of this order, is not a necessity but is advantageous when using ultraviolet light as the catalyst or one of the catalysts, because a higher concentration of polymer tends to reduce the transmission through the liquid of the ultraviolet light. If a chemical catalyst is used without ultraviolet light, then a somewhat higher concentration of polymer may be allowed to build up in the vessel 11.

The separator itself, for taking the small amount of polymer out of the material constantly withdrawn from the vessel 11, is indicated in general at 35, and may take various possible forms, such as a filter, a centrifuge, or any other known means for economically separating a fine solid from a liquid. Passing for a moment the details of this separator, it is sufficient to say at this point that the extracted polymer, together with enough monomer to make it readily flowable, is drawn out of the separator 35 through the conduit 37, while the remaining monomer is drawn out through the conduit 39 and pumped by the pump 41 through the return conduit 43, which, as shown, leads back to the reacting vessel 11 at a point a little above the liquid level 17 therein. It is preferably in conjunction with the flow through this return line 43 that provision is made for catalytic action, and preferably this provision takes the form of both an ultraviolet light catalyzer and an inlet for a chemical catalyst. The conjoint use of both catalysts has certain advantages, but either one may be turned off, or may be entirely omitted from the apparatus, if desired.

In the preferred form, the catalyzer 45 comprising a chamber having in it an ultraviolet light source past which the liquid flows, is arranged in the return flow line 43 as shown, so that the ultraviolet light, acting on the flowing liquid at this point, produces its catalytic action to cause the conversion of the monomer to the polymer. A by-pass 46, having a control valve, extends around the catalyzer 45, and the catalyzer has valves on both its inlet and outlet, as shown, so that it may be removed for any necessary repairs to the ultraviolet light source without having to shut down the continuous process. Beyond the catalyzer 45, the main flow pipe 43 has a valved branch 47 through which a chemical catalyst is preferably introduced. Any chemical catalyst known in the art may be used, as for example the persulfates and the peroxides, or mixtures of them.

The polymer, mixed with enough of the monomer so that the mixture flows freely, is drawn off, as above mentioned, through the conduit 37, controlled by a valve 51 which may be throttled down to any desired extent so as to determine the proportions of polymer and monomer which are allowed to flow through this conduit. Conveniently, but not necessarily, the valve may be throttled down so as to take a mixture of about 80% polymer and 20% monomer, which is a mixture which flows freely. If the valve is opened farther, a larger proportion of monomer is taken. The mixture of polymer and monomer, after passing through the control valve 51, continues through the conduit 37 and into the upper part of a suitable separator such as the cyclone 53 where the monomer is taken off as a vapor through the upper conduit 55 and the polymer is drawn off at the bottom through a conduit 57 leading to a suitable air lock device enabling the solid or semi-solid polymer to be drawn out of the cyclone without loss of the desired vacuum in the cyclone. Such a device may be of various known forms; for example, a rotary air lock, or, preferably, an air ejector 59, wherein compressed air is introduced at 61, and the mixture of air and polymer is passed along the conduit 63, while maintaining the desired degree of vacuum in the conduit 57 leading from the bottom of the cyclone 53. Atmospheric pressure may be maintained in the cyclone 53, as this will normally assure vaporization of the monomer at normal room temperature, thus effecting the separation of the monomer from the polymer, since the monomer boils at about −14 degrees C. But a small heating coil may be used in the cyclone if it tends to frost up too much, in order to assure complete vaporization of all monomer.

The conduit 63 delivers the mixture of polymer and air to any suitable comminuting device or mill indicated diagrammatically at 65, for the purpose of breaking up any lumps of polymer to the desired degree of fineness. The comminuting device or mill 65 may be of any suitable known form, the details of the mill forming no part of the present invention. For example, it may conveniently be the type of mill known to the trade as an "Imp" mill. Its function is merely to break up any lumps of the polymer to a fine powdery state, sufficiently fine so that the powdered polymer may be floated upwardly by a current of air, through the conduit 67, to the upper part of a cyclone 69, from which the surplus air is exhausted through the top conduit 71, while the powdered solid polymer falls by gravity to the bottom of the cyclone 69 and is drawn off through the conduit 73, controlled by a valve 75, to bags or other suitable packages.

Going back now to the first cyclone 53, it has already been mentioned that the monomer is drawn off in vapor phase from the top of the cyclone 53, through the conduit 55. This conduit leads to any suitable compressor 81 of known construction, capable of maintaining a suitable vacuum on the inlet side of the compressor (that is, the side connected to the conduit 55) and capable of producing the desired pressure at the outlet side of the compressor, which is connected to the conduit 83 leading back to the upper part of the vessel 11. In order not to contaminate the monomer vapor with compressor lubricating oil, this compressor is preferably of the reciprocating piston type in which the piston is packed by graphite or carbon rings, and in which no lubricating oil is used in the cylinder. But any other suitable known form of non-contaminating compressor capable of drawing a vacuum on the line 55 and producing a pressure on the outlet line 83 may be used, the details of construction being unimportant for purposes of the present invention.

In the upper part of the vessel 11, near the point where the monomer vapor is introduced through the line 83, there is a reflux condenser coil 91 supplied with cold water flowing through the inlet conduit 93 and the outlet conduit 95. Thus the monomer vapor separated from the polymer in the cyclone 53 is refluxed into the system through the conduit 83, and is condensed by the condenser coil 91 and drops downwardly into the body of boiling liquid in the lower part of the vessel 11.

Referring now to the separator 35 which has previously been briefly mentioned, this part of the equipment is intended to effect separation of the polymer from the monomer to as great an extent as can be done consistent with flowability of the separated mixture, and at the same time to accomplish this separation under the considerable pressures which are to be maintained at this point in the system. As already indicated, the separator may take various forms without departing from the broader aspects of the invention. In the particular form here disclosed as being suitable for present purposes, the separator includes a closed outer jacket or container 35 through which the above mentioned conduits 31, 37, and 39 extend in a tightly sealed manner. Within this container 35 is a hollow shaft 101 mounted in suitable bearings and rapidly rotated by an electric motor indicated diagrammatically at 102, built into the sealed space 104 at the bottom of the separator. The shaft 101 carries a rotating centrifuge basket 103 of somewhat diamond shape in axial cross section, as well seen in Fig. 3. A second shaft 105, having its lower end located within the shaft 101, is rotatable relative to the shaft 101. This shaft 105 has two or more hollow arms 107 located approximately at the plane of maximum diameter of the basket 103, and extending approximately radially outwardly almost to the walls of the basket. These arms 107 serve as outlet arms for drawing off the heavier components from the maximum diameter part of the centrifuge basket, and the arms conduct the heavier components to the central shaft 105 whence the material flows up through a hollow part 109 of this shaft and out through the open top of the shaft into a compartment 113 in the upper part of the container 35, from which compartment the conduit 37 leads. The shaft 105 is sealed in a pressure-tight manner to the bottom wall of the compartment 113, by means of a collar 110 which is tightly fixed to the top of the shaft and has an accurate lapped bottom surface making sealing contact with a packing ring 111 supported from and pressed upwardly by the sylphon bellows 112 mounted on and sealed to the bottom wall of the chamber 113. The rotating body of material in the basket 103 will cause the arms 107 and shaft 105 to rotate almost but not quite as fast as the rotation of the basket 103.

A tube 115 surrounds the upper part of the shaft 105, leaving an annular space 117 between this tube and the shaft 105. The inlet conduit 31 discharges into this annular space, and the mixture of monomer and polymer, constantly withdrawn from the bottom of the vessel 11 through the conduit 31, passes into this annular space, thence downwardly into the rapidly rotating centrifuge basket 103, where the centrifugal force causes the heavier polymer to seek the maximum diameter part of the basket 103 where it is drawn off through the hollow arms 107 and tubular part 109 to the conduit 37. The lighter monomer fills the basket and overflows through the annular top opening 121 thereof, thence flowing down the outside of the basket to the bottom of the container 35, where it is drawn off through the conduit 39 to the pump 41 and returned through the line 43 and past the catalyzer 45, back to the reaction vessel 11.

It will now be seen why the wider opening of the valve 51 in the conduit 37 will draw off a smaller proportion of polymer and a larger proportion of monomer, whereas the throttling down of this valve will increase the proportion of polymer and decrease the proportion of monomer drawn off through the conduit 37. If the outward flow through the conduit parts 107, 109, and 37 is relatively unrestricted, there will be little chance for the centrifugal separating action to take place in the basket 103, and the conduit 37 will receive polymer and monomer in almost the same proportions in which they are drawn off from the vessel 11 through the conduit 31. But if the outward flow through the conduits 107, 109, and 37 is throttled down, it is seen that the mixture of monomer and polymer in the rotating centrifuge basket 103 has time to be acted upon by centrifugal forces and to tend to separate, with the consequence that the concentration of polymer in the maximum diameter part of the basket 103 (near the ends of the hollow arms 107) is increased, and a greater proportion of polymer is drawn off. For the sake of economy of operation of the process it is desirable, of course, to draw off as high a concentration of polymer as possible, but for the sake of having the polymer flow freely, some monomer must be included with it at this stage of the process. Good results are obtained by throttling down the valve 51 to a point where the conduit 37 will carry a mixture of roughly about 80% of polymer and 20% of monomer.

To recapitulate, fresh vinyl chloride monomer is introduced into the vessel 11 through the conduit 13 at such rate as to keep the liquid level within the vessel 11 approximately at the line 17. The coil 21 in the lower part of the vessel 11 below the liquid level is initially used as a heating coil to cause the liquid to boil. When the heat is cut off, boiling continues due to the exothermic nature of the reaction, and the boiling causes constant agitation of the contents, so that no local hot spots are produced and danger of explosion is practically eliminated. The coil 21 is now used as a cooling coil to control the degree of heat. Monomer is constantly circulated through a closed cycle, out through the bottom of the vessel 11 through the conduit 31, through the separator indicated in general at 35, and through the conduit 39, pump 41, and conduit 43, past the catalyzer 45, and back into the vessel 11. Due to the effect of the ultraviolet light catalyzer 45, plus the effect of the chemical catalyst introduced through the conduit 47, the heating of the monomer within the vessel 11 causes polymerization of some of the monomer into the polymer. (Either the ultraviolet light catalyst or the chemical catalyst may be used alone, if preferred.) The resulting mixture of a major amount of monomer and a minor amount of polymer is drawn off through the conduit 31, and the polymer is largely separated from the monomer in the separator 35. The separated monomer goes back to the reacting vessel 11 through the conduit 39, pump 41, conduit 43, and catalyzer 45. A mixture of the separated polymer with enough monomer to make it flowable passes through the conduit 37 to the cyclone 53, where the monomer is vaporized and drawn off through the conduit 55, compressor 81, and conduit 83 leading back to the upper part of the vessel 11, where the monomer vapors are condensed by the reflux condenser. The polymer separated from the monomer in the cyclone 53 is drawn off through the conduits 57 and 63 to the mill 65 which pulverizes the polymer, whereupon the pulverized polymer is carried by air current to the cyclone 69, where it settles, ready to be drawn off into bags or otherwise packaged.

Thus the polymer is produced economically by a continuous process involving conversion of the substantially pure monomer and in a relatively safe manner as distinguished from the prior processes which have involved great danger of explosion, and which prior processes have usually been of a batch nature (rather than a continuous nature) when block polymerization has been used, and which have been of an emulsion or suspension nature (rather than a block nature) when the process has been continuous. The present process eliminates the undesirable features of the emulsion, suspension, and solution processes heretofore operated on a continuous basis, and the undesirable features of a batch or intermittent process heretofore employed in making polyvinyl chloride by a block process.

Close control of the process is possible, to obtain at all times the desired temperature in the reaction vessel, and the desired degree of separation of polymer from monomer.

A branch line 32 leads from the conduit 31 to a safety outlet, preferably in the form of a frangible diaphragm, as an extra precaution.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. The continuous process of producing polyvinyl chloride from vinyl chloride monomer which comprises the steps of causing boiling of a body of catalyzed monomer to cause the production in the monomer of a relatively small proportion of polymer and to cause the monomer to exist simultaneously in both liquid phase and vapor phase, continuously condensing a portion of the vapor phase monomer and refluxing it to the liquid phase monomer, continuously withdrawing a quantity of the heated mixture of monomer and polymer, partially separating the withdrawn mixture into a monomer portion and a mixed monomer and polymer portion, continuously returning the separated monomer portion to the boiling body of monomer, further separating the mixed monomer and polymer portion into a monomer component and a polymer component, and continuously returning the monomer component to the boiling body of monomer.

2. The process as defined in claim 1, in which ultraviolet light is used as a catalyst.

3. The process as defined in claim 1, in which a chemical catalyst is employed.

4. The process as defined in claim 1, in which the boiling of the monomer and the separation of the resulting mixture into a monomer portion and a mixed monomer and polymer portion are both accomplished under superatmospheric pressure.

5. The process as defined in claim 1, in which the further separation of the monomer component and the polymer component is accomplished under approximately atmospheric pressure.

6. The process as defined in claim 5, in which the monomer component is separated in vapor phase from the polymer component.

7. The process as defined in claim 1, in which the separated monomer component is returned in vapor phase to the presence of the boiling body of monomer.

8. The process as defined in claim 1, in which the separated monomer component is returned in vapor phase to the presence of the boiling body of monomer and is there condensed.

9. The process as defined in claim 1, in which the monomer is boiled relatively violently to produce agitation of the body of monomer and avoid local hot spots therein.

10. The process as defined in claim 1, in which the separation of the mixture into a monomer portion and a a mixed monomer and polymer portion is accomplished under super-atmospheric pressure by centrifugal action dependent upon the difference in specific gravity of the monomer and the polymer.

11. The continuous process of producing polyvinyl chloride from vinyl chloride monomer which comprises the steps of initially heating the monomer in an enclosed chamber to cause boiling of the monomer and to cause it to exist simultaneously in both liquid and vapor phase, maintaining the monomer in said liquid and vapor phases by its exothermic action, continuously eliminating a portion of the monomer existing in the vapor phase for controlling the pressure, subjecting the monomer to the influence of a catalyst to cause the conversion of some of the hot monomer to the polymer, continuously supplying fresh monomer to the enclosed space, continuously withdrawing a mixture of the monomer and polymer from the enclosed space, continuously separating the withdrawn mixture into a portion containing most of the withdrawn monomer and another portion containing most of the withdrawn polymer, and continuously returning the separated portion containing most of the withdrawn monomer back to the enclosed space in which the monomer is being heated.

12. The process as defined in claim 11, in which said boiling is sufficiently violent to produce substantial agitation of the liquid monomer in said enclosed space, to avoid local hot spots therein.

13. The process as defined in claim 11, in which the pressure within said enclosed chamber is controlled by condensing a portion of the vapor phase of the monomer and refluxing it to the liquid monomer.

14. The process as defined in claim 11, further characterized in that the mixture is withdrawn from the enclosed space at such rate, compared with the rate of polymerization in said space, that the withdrawn mixture contains a major portion of monomer and a minor portion of polymer.

15. The process as defined in claim 14, in which the withdrawn mixture is about 99 parts monomer to 1 part polymer.

References Cited in the file of this patent

UNITED STATES PATENTS

| | | |
|---|---|---|
| 1,721,034 | Ostromislensky | July 16, 1929 |
| 1,920,403 | Klatte et al. | Aug. 1, 1933 |
| 2,405,019 | Dalin | July 30, 1946 |
| 2,505,067 | Sachs et al. | Apr. 25, 1950 |
| 2,548,685 | Sachs et al. | Apr. 10, 1951 |
| 2,608,660 | Noebels | Aug. 26, 1952 |